US007716840B2

(12) United States Patent
Nandkumar et al.

(10) Patent No.: US 7,716,840 B2
(45) Date of Patent: May 18, 2010

(54) TUBING CUTTER

(75) Inventors: Nyayadhish Sunil Nandkumar, Maharashtra (IN); Pathak Sanjay Sitacharan, Maharashtra (IN); David Lee Machovina, Elyria, OH (US); Steven Michael Macsay, Strongsville, OH (US); Glen Richard Chartier, Avon Lake, OH (US)

(73) Assignee: Emerson Electric Co, St. Louis, MO (US)

( * ) Notice: Subject to any disclaimer, the term of this patent is extended or adjusted under 35 U.S.C. 154(b) by 254 days.

(21) Appl. No.: 11/708,266

(22) Filed: Feb. 20, 2007

(65) Prior Publication Data

US 2008/0141538 A1 Jun. 19, 2008

(30) Foreign Application Priority Data

Dec. 15, 2006 (IN) ..................... 2059/MUM/2006

(51) Int. Cl.
*B26B 13/00* (2006.01)
*B23D 21/06* (2006.01)
*B26B 27/00* (2006.01)
*B21F 13/00* (2006.01)

(52) U.S. Cl. ............................ 30/249; 30/238; 30/92.5; 30/91.2

(58) Field of Classification Search ................... 30/249, 30/238, 244, 250, 92.5, 91.2, 239, 258
See application file for complete search history.

(56) References Cited

U.S. PATENT DOCUMENTS 1,931,045 A * 10/1933 Vosbikian et al. ............. 30/237
2,093,987 A 9/1937 Wallace
2,207,994 A 7/1940 Trapp
2,262,645 A 12/1941 Newman
2,508,790 A 5/1950 Herr
2,528,816 A 11/1950 Boyer
2,564,154 A 8/1951 Compton
2,900,722 A 8/1959 Weisenburger
4,084,317 A * 4/1978 Nakamura et al. ............. 30/94

(Continued)

FOREIGN PATENT DOCUMENTS

DE 2623550 12/1977

OTHER PUBLICATIONS

International Search Report, Nov. 30, 2007 (5 pages).

(Continued)

*Primary Examiner*—Ghassem Alie
*Assistant Examiner*—Bharat C Patel
(74) *Attorney, Agent, or Firm*—Rankin, Hill & Clark LLP

(57) ABSTRACT

A cutter tool includes first and second elongate members carrying a cutting blade pivotally attached with the second member and slidably attached with the first member to enable cutting a tubular workpiece with an increased mechanical advantage. The tool has a first handle having a cradle for supporting a tube to be cut, a second handle pivotally attached to the first handle, a cutter blade attached to the second handle, and a pin and slot between the cutter blade and the first handle. The slot configuration provides for displacement of the blade relative to the cradle to initially apply a higher cutting force which is followed by a transition to a lower cutting force and a higher rate of blade displacement.

17 Claims, 8 Drawing Sheets

U.S. PATENT DOCUMENTS

| | | | | |
|---|---|---|---|---|
| 4,186,484 | A | | 2/1980 | Tanaka |
| 4,312,127 | A | * | 1/1982 | Tanaka .......................... 30/92 |
| 4,341,016 | A | * | 7/1982 | Harrison et al. ............... 30/262 |
| 4,525,929 | A | | 7/1985 | Brophy et al. |
| 4,696,107 | A | * | 9/1987 | Held ........................... 30/246 |
| 5,950,314 | A | * | 9/1999 | Chang ......................... 30/244 |
| 5,970,617 | A | * | 10/1999 | Chang ......................... 30/249 |
| 6,513,245 | B1 | | 2/2003 | Aubroit |
| 6,513,248 | B2 | | 2/2003 | Linden et al. |
| 6,658,738 | B1 | | 12/2003 | King |

OTHER PUBLICATIONS

Written Opinion of the International Search Authority, Nov. 30, 2007 (5 pages).
Notification of Transmittal of the International Search Report and the Written Opinion of the International Searching Authority, or the Declaration, Nov. 30, 2007 (2 pages).
2004 Rigid Full Line Catalog; copyright 2004; p. 74, Tubing Tools, Tubing Cutters.

* cited by examiner

TUBING CUTTER

BACKGROUND

This application relates to the art of cutting devices and, more particularly, to improvements in tools for cutting workpieces having a circular cross section such as tubing. Although the preferred embodiment will be described in connection with a manual tubing cutter apparatus for cutting plastic tubes by hand, it is to be appreciated that the invention has application in other areas including devices for cutting, clipping, or otherwise applying a force to associated workpieces.

A wide variety of tubing cutters has been provided heretofore for cutting plastic tubing of the character used in commercial and domestic water systems, such as schedule 40 PVC tubing, for example. Such cutters have included scissors-type cutters such as that shown in U.S. Pat. No. 6,513,245 to Aubriot and U.S. Pat. No. 6,658,738 to King wherein a tube to be cut is supported in a cradle portion of the cutter and a blade is displaceable about a fixed pivot axis to cut a tube interposed between the cradle and blade. In the King patent, the pivot axis is adjustable to accommodate the cutting of tubes of different diameter.

The scissors-type cutters which require a squeezing action of the handles requires an excessive effort on the part of the user to achieve a cutting operation, especially with larger diameter tubing. Partly in this respect, these tools require the user to rock or rotate the tube and cutter in opposite directions while squeezing the handles to apply a cutting load. Furthermore, with initially cutting through a larger diameter tube, a user who has a small hand span has difficulty in applying the necessary closing force on the handles to achieve initial cutting of the tube and, often, has to grasp the handles with both hands to initiate cutting.

Another type of tubing cutter heretofore available includes a cradle for supporting a tube to be cut and a pivotal cutting jaw or blade which is intermittently displaced toward the cradle by means of a ratchet mechanism. While the ratchet mechanism allows a smaller stroke of the cutter handles relative to one another for each intermittent cut, whereby a user can operate the cutter without a large hand span, the cutters are structurally complex and a cutting operation requires a number of sequential displacements of the ratchet handle relative to the cutting head to complete a cutting operation, especially with respect to larger diameter tubes. Accordingly, more work and time is required than is desirable.

In addition to such tubing cutters, a number of metal shears and pruning devices have been provided in which manipulation of the handles of the cutters provide for a slicing displacement of a cutter blade relative to an anvil surface or the like against which an object is pressed during the cutting operation. Such shears are shown, for example, in U.S. Pat. No. 2,508,790 to Herr, U.S. Pat. No. 2,528,816 to Boyer, and U.S. Pat. No. 2,564,154 to Compton. These cutting devices are characterized by a pair of handles pivotally interconnected with one another, a cutter blade pivotally attached to one of the handles and a mechanism such as a pin and slot arrangement between the blade and the other handle by which the blade is displaced in a shearing and slicing motion in response to closure of the handles relative to one another. The angular blade travel during cutting with shears of this character is less than the angular displacement required to close the handles relative to one another, whereby the diameter of an object to be cut is limited in order to provide for a user to grasp and close the handles with just one hand. Further, cutting is achieved by a combination of shearing and slicing motions, whereby the force required on the handles to achieve cutting is very uniform throughout the cutting stroke.

BRIEF DESCRIPTION

In accordance with the present application, an improved tubing cutter is provided, especially for plastic tubing of the type mentioned above, which advantageously enables the single stroke of large diameter tubing, such as 1-3/8 inch tubing for example, with less force than heretofore required with regard to closing the handles of the cutter to achieve the cutting operation. More particularly in this respect, the cutter is characterized by a first handle having a cradle for supporting a tube to be cut, a second handle pivotally attached to the first handle, a cutter blade attached to the second handle for displacement therewith and relative thereto, and a pin and slot interengagement between the cutter blade and the first handle by which the angular displacement of the cutter blade from an open to a closed position relative to the cradle is greater than the angular displacement of the handles to achieve such blade displacement. Accordingly, a longer cutting stroke is achieved with a given handle displacement than heretofore possible, thus enabling the cutting of large diameter tubing with a single stroke, one hand manipulation of the cutters by a user.

In accordance with another aspect of the application, an improved tubing cutter is provided, especially for plastic tubing of the type mentioned above, which advantageously provides a mechanical advantage to users of the tubing cutter. In this aspect of the application, the slot configuration provides for displacement of the blade relative to the cradle to initially apply a higher cutting force which is followed by a transition to a lower cutting force and a higher rate of blade displacement. Accordingly, a user can grasp the open handles of the cutters closer to the pivot axis between the handles to promote a better gripping of the handles and then, when the cutting stroke is in progress, the user can grasp the handles closer to the outer ends thereof and apply the same cutting force as was initially applied with the hands close to the pivot axis. In this respect, as the transition takes place to the lesser cutting force the user's grasping of the handles adjacent the outer ends thereof increases the leverage and thus enables obtaining the initial force in completing the cutting operation.

It is accordingly an overarching object of the present application to provide an improved tubing cutter, especially for plastic tubing.

Another object is the provision of an improved tubing cutter of the character having a pair of handles pivotally interconnected with one another and a blade pivotally attached to one of the handles and interconnected with the other for displacement of the handles from an open to a closed position to pivotally displace the blade from an open to a closed position relative to a tube being cut.

Yet another object is the provision of a tubing cutter of the foregoing character in which the angular displacement of the blade from the open to the closed position is greater than the angular displacement of the handles from the open to the closed position.

A further object is the provision of a tubing cutter of the foregoing character which provides for single stroke cutting of tubing to be achieved with less physical effort than heretofore required on the part of a user.

Still another object is the provision of a tubing cutter of the foregoing character which provides a high leverage during the initial cutting of a tube followed by lower leverage and a higher cutting rate as the cutting operation is completed.

BRIEF DESCRIPTION OF THE DRAWINGS

The foregoing objects, and others, will in part be obvious and in part pointed out more fully hereinafter in conjunction with the written description of preferred embodiments of the invention shown in the accompanying drawings in which.

DETAILED DESCRIPTION

Figure 1:
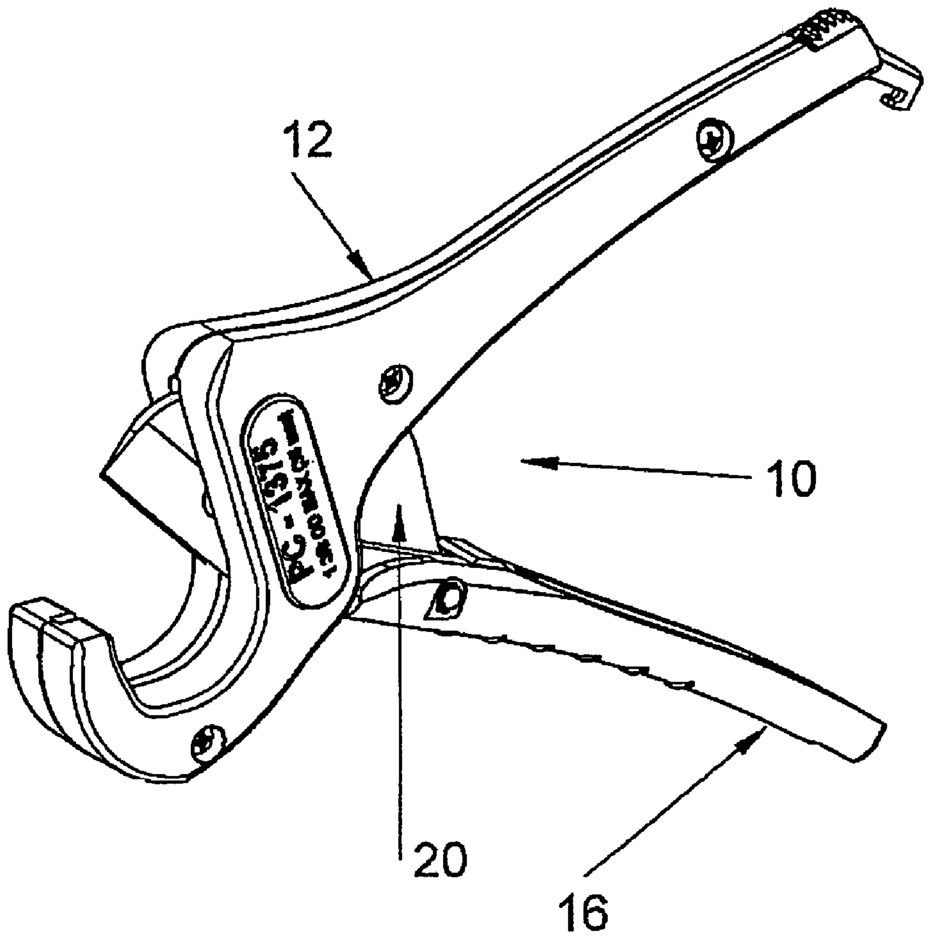
FIG. 1 is a perspective view of a tubing cutter apparatus in accordance with the preferred embodiment.
Figure 2:
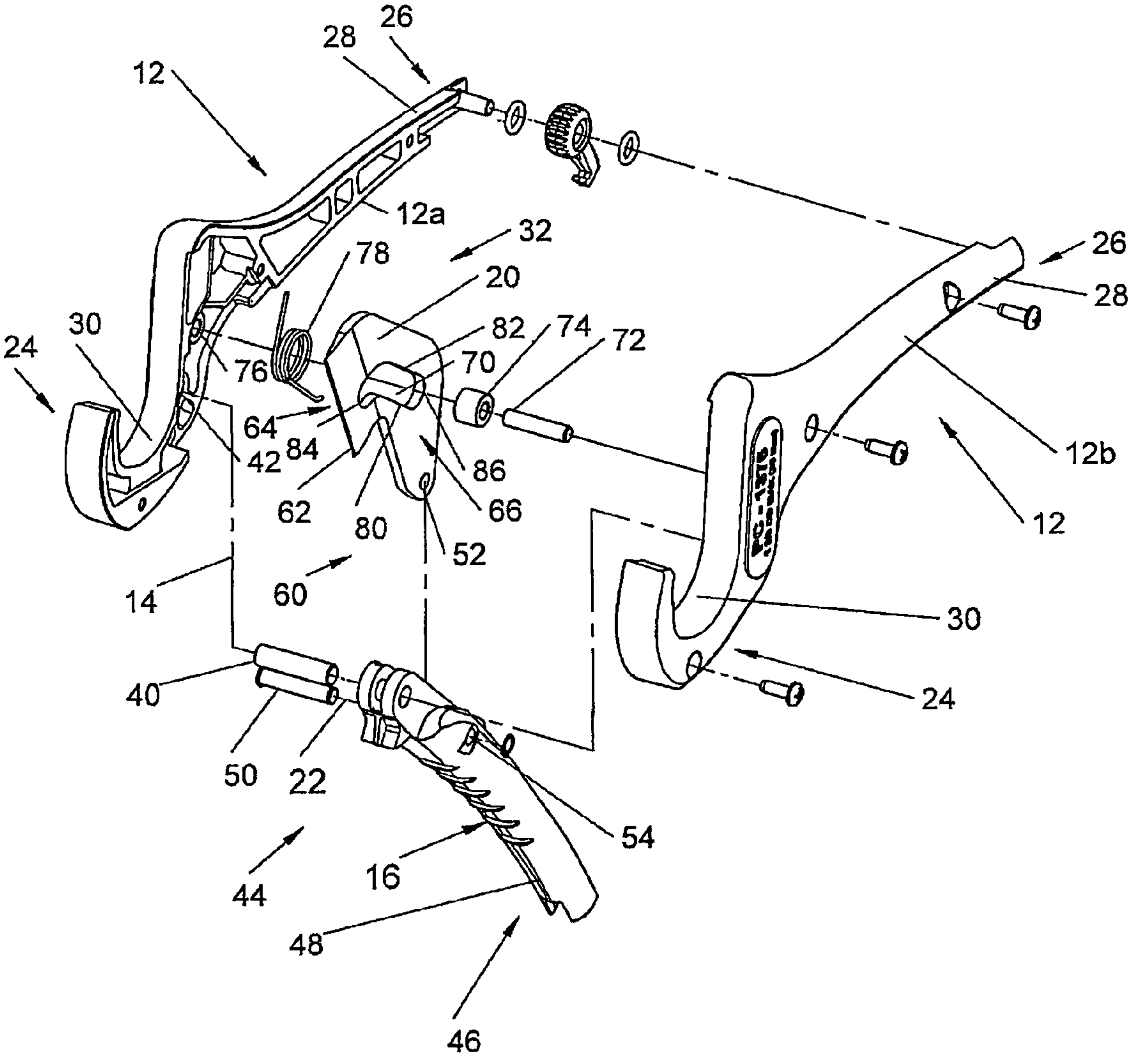
FIG. 2 is an exploded perspective view of the tubing cutter in accordance with the present application and as shown in FIG. 1.

Referring now in greater detail to the drawings, wherein the showings are for the purpose of illustrating preferred embodiment of the present invention and not for the purpose of limiting the invention, FIG. 1 provides a perspective view of the subject tubing cutter apparatus 10 in a partially opened position and FIG. 2 is an exploded perspective view illustrating the various preferred components thereof and their preferred arrangement in the subject tool.

As shown in those Figures, the preferred form of the tubing cutter 10 comprises a first elongate member 12 pivotally attached at a handle axis 14 with a second elongate member 16, and a cutter blade 20 pivotally attached at a blade axis 22 with the second elongate member 16 as shown. In the preferred embodiment illustrated, the first elongate member 12 is defined by handle halves 12*a* and 12*b*, each of which has a first end 24 and an opposite second end 26. Ends 24 are provided with corresponding arcuate cradle portions 30 which, when the cutter is assembled, provide a cradle area for supporting a tube to be cut. The opposite ends 26 of the first elongate member 12 are provided with first handle portions 28 used for gripping the cutter tool 10 during use thereof. Somewhat centrally located in the first elongate member 12 is provided a first guide portion 32 for guiding movement of the cutter blade 20 relative to the first and second elongate members 12, 16 in a manner to be described in greater detail below to provide an increased cutting range, enhanced mechanical advantage, and other benefits.

In the preferred embodiment illustrated, the cutter tool 10 includes a second elongate member 16 pivotally mounted to the first elongate member 12 by a pin 40 having opposite ends received in a pin support 42 in each of the handle halves 12*a*, 12*b*, only one of which is visible in FIG. 2, whereby the second elongate member 16 and the pivot pin 40 are captured between the assembled handle halves 12*a*, 12*b*. Overall, the second elongate member 16 includes first and second ends 44, 46, the first end 44 being pivotally attached with the first elongate member 12 at the handle axis 14 and the second free end 46 defines a second handle portion 48 of the tool. The second handle portion is configured to complement the first handle portion 28 the pair and together are useful for gripping and operating the subject cutter tool 10 by hand.

The cutter tool 10 further includes a cutter blade 20 pivotally mounted on the second elongate member 16 by means of a blade pivot pin 50 which extends through a blade pin opening 52 in the cutter blade 20. The blade pivot pin 50 has opposite ends received in a pin support pair 54 formed of the second elongate member 16, only one of which is visible in FIG. 2. In this manner, the cutter blade 20 is movable about the blade pivot pin 50 in a blade axis 22 substantially aligned in parallel with the handle axis 14. It is to be appreciated by those skilled in the art that the cutter blade 20 is pivotally movable in a plane extending perpendicular with each of the handle and cutter blade axes 14, 22.

Figure 3:
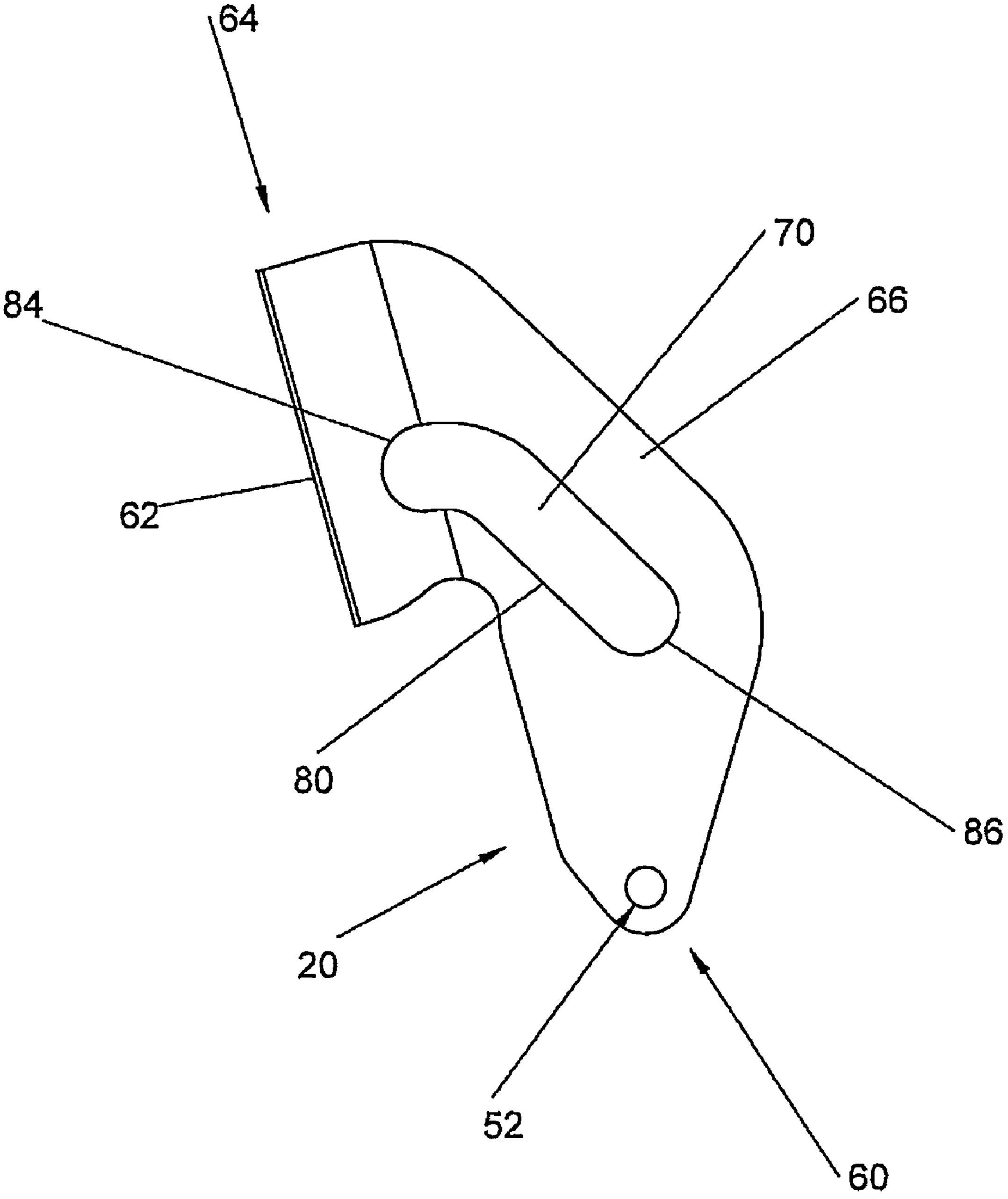
FIG. 3 is a plan view of the cutter blade of the tubing cutter of FIGS. 1 and 2.

With particular reference now to FIG. 3, showing the cutter blade 20 removed from the first and second elongate members 12, 16 , the blade pin opening 52 is formed on a first end 60 of the cutter blade and a cutting edge 62 is formed on a second end 64 of the cutter blade opposite the first end 60 . In addition, a second guide portion 66 is provided on the cutter blade between the first and second ends 60, 64 as illustrated. The second guide portion 66 is operative with the first guide portion 32 provided on the first elongate member 12 to effect the desired movement of the cutter blade 20 relative to the first and second members 12, 16 during use of the tool. In its preferred form, the second guide portion 66 defines an elongate cam slot 70 receiving a cam follower which in the present embodiment is in the form of a pin 72 and roller 74. The pin 72 has opposite ends received in pin recesses 76 formed in the handle halves 12*a*, 12*b*, only one of which is visible in FIG. 2, whereby the follower and thus cutter blade 20 are captured between the assembled handle halves. A torsion spring 78 is mounted between the handle halves 12*a*, 12*b* coaxial with the cam follower and has opposite ends respectively interengaging the first and second handles to bias the handles toward an open position relative to one another. The cam slot 70 has a predetermined shape and is defined between spaced apart elongate side walls 80, 82 extending between spaced apart end walls 84, 86. In its preferred form, the cam slot 70 is generally L-shaped as shown, but can take on any shape including a generally straight slot, a crescent, an arc, multiple connected arcs, or any other regular or irregularly selected shape to realize the benefits of the subject tool as described above. It is to be appreciated that the shape of the slot is based in part on the dimensions of other components of the subject tool. As noted, the cutter blade defines a blade pin opening 52. The cutter blade 20 has its first end 60 pivotally attached with the second elongate member 16 by the blade pin opening 52 and the blade pivot pin 50 extending therethrough. The second guide portion 66 includes the elongate slot 70 defined in the blade 20. The slot 70 is disposed between the blade pin opening 52 of the cutter blade 20 and the second blade end 64 of the cutter blade 20.

Figure 4A:
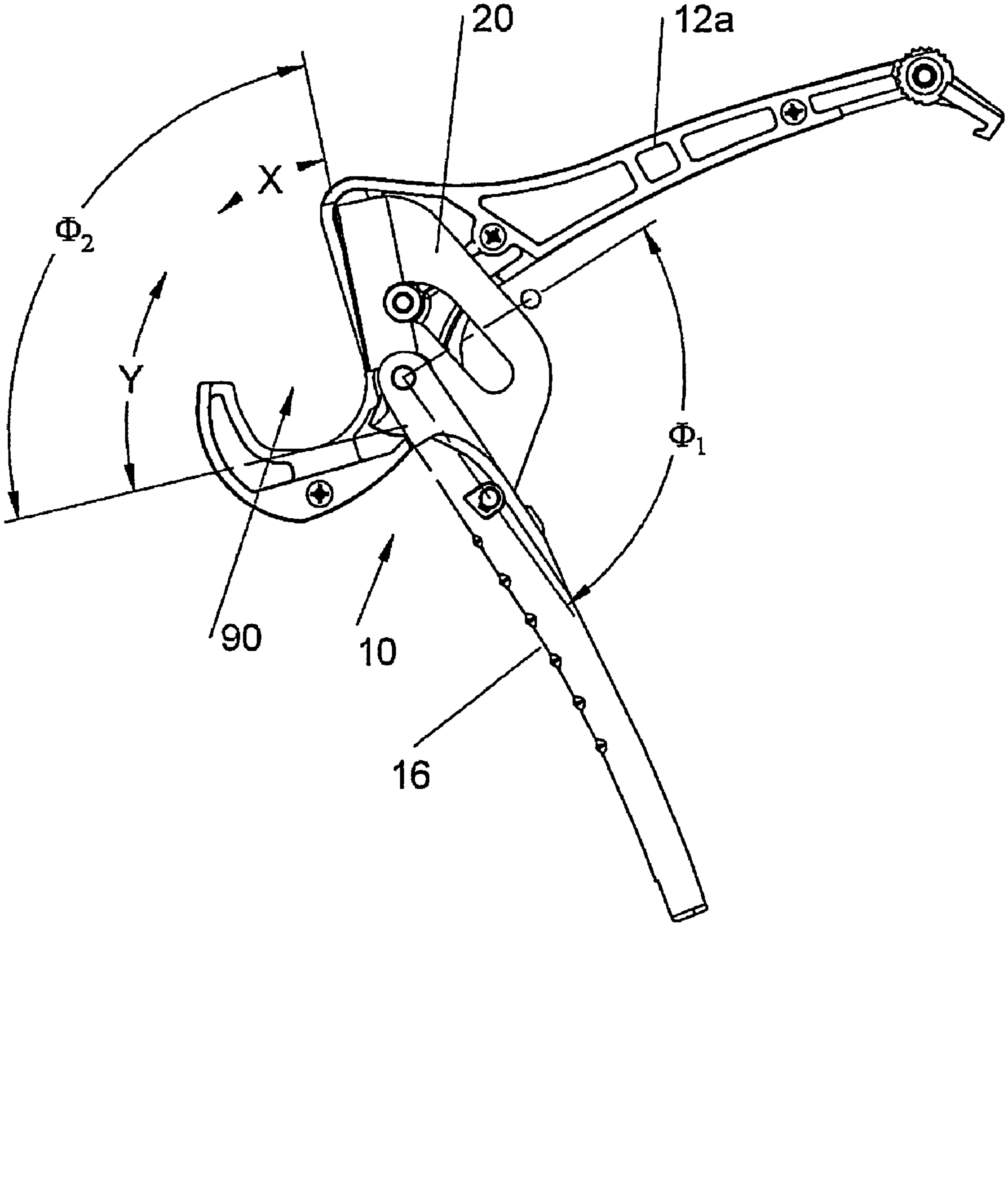
FIGS. 4*a*, 4*b*, and 4*c* are partial cross-sectional views of the subject tool illustrating a relative range of movement between the handle portions and the blade portion thereof.
Figure 4B:
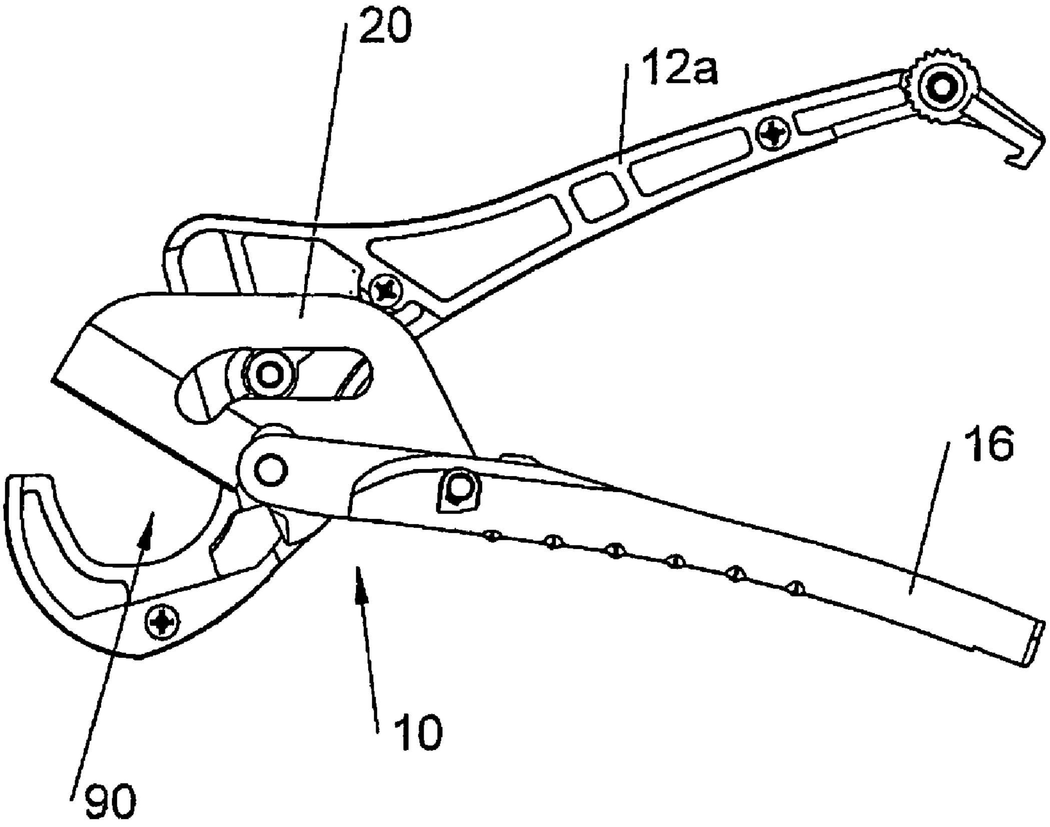
Figure 4C:
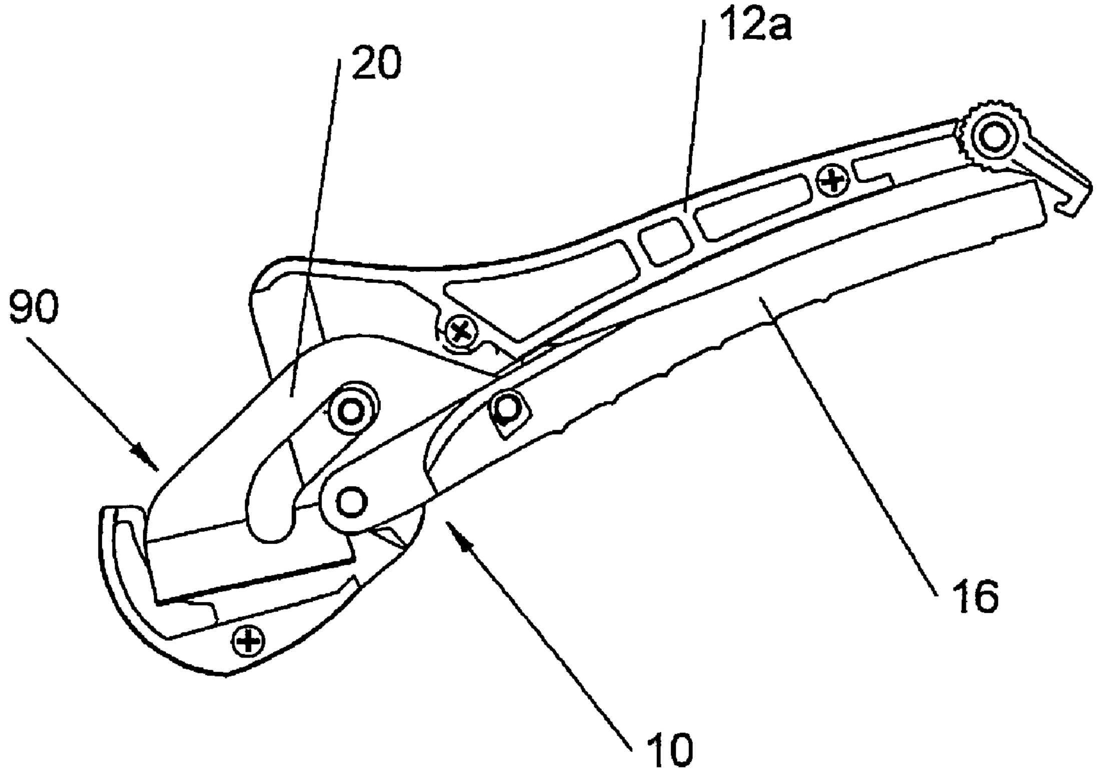

As shown schematically in FIGS. 4*a*, 4*b*, and 4*c*, the cutter blade 20 is pivotable relative to the second elongate member 16 about the blade axis 22 in a manner described above. Essentially, the cutter blade 20 is pushed forward into the cavity 90 forming a work area as the second elongate member 16 is closed toward the first elongate member 12 through interaction of the blade pivot pin 50 urging the cutter blade 20 forward. Simultaneous with pivotal movement of the blade relative to the second elongate member, the first and second guide portions 32, 66 mutually cooperate to urge the second end 64 of the cutter blade carrying the cutting edge through arcuate movement in the cavity region 90. More particularly, the preferred tubing cutting is configured to enable pivotal movement between the first and second elongate members 12, 16 about the handle axis 12 through a first angle $\Phi_1$ between an open position as illustrated in FIG. 4*a* whereat the first and second handle portions 28, 48 are in a fully spaced apart position and a fully closed position as illustrated in FIG. 4*c* whereat the first and second handle portions 28, 48 are in close alignment. FIG. 4*b* illustrates an intermediate handle position between the fully opened position shown in FIG. 4*a* and the fully closed position shown in FIG. 4*c*. In the preferred embodiment of the hand tool illustrated, the first angle $\Phi_1$ is about 85.5 degrees.

Together with movement of the handle portions through the first angle as described above, the cutter blade is rotated and moved forward into the cavity area 90 for cutting an associated tube disposed in the cradle portion 30. Initially, the cutter blade 20 is disposed in a retracted position whereat the cutting edge 62 of the cutter blade 20 is spaced from the cradle portion 30 of the first elongate member 12. The cutter blade, however, is pivotally movable about the blade axis 22 through a second angle $\Phi_2$ between the retracted position illustrated in FIG. 4*a* and an extended position illustrated in FIG. 4*c* whereat the cutting edge 62 is brought through the cradle portion and cavity 90. In its preferred form, the second angle is about 91.3 degrees.

In addition to the above, it is important to note that the subject tool 10 provides an enhanced mechanical advantage in a first portion X of the second angle between the retracted position and the extended position and a area of lower mechanical advantage Y in a substantially extended region of cutter blade movement. A transition between a higher mechanical advantage and a lower mechanical advantage of the cutter blade occurs at approximately mid travel of the cutter blade through the cavity 90. Essentially, the ratio of blade travel to handle travel is constantly changing throughout the entire handle advancement. The total blade travel is greater than the total handle travel overall as described above. Preferably, for every degree of handle advancement in a closed direction, the blade advancement is different permitting the cutting of a larger size tube with a smaller hand span than would be possible with a standard scissors cutter. In accordance with the preferred embodiment, for every five degrees of incremental handle travel, the blade rotational movement is between about 8.2 degrees and about 4.4 degrees of movement. A chart identifying respective handle and blade movement is provided below.

| Incremental Handle Travel | Cumulative Handle Travel | Incremental Blade Travel | Cumulative Blade Travel |
|---|---|---|---|
| | Open Position | | Retracted Position |
| 5 | 5 | 5.6 | 5.6 |
| 5 | 10 | 5.1 | 10.7 |
| 5 | 15 | 4.8 | 15.5 |
| 5 | 20 | 4.7 | 20.2 |
| 5 | 25 | 4.6 | 24.8 |
| 5 | 30 | 4.5 | 29.3 |
| 5 | 35 | 4.4 | 33.7 |
| 5 | 40 | 3.5 | 38.3 |
| 5 | 45 | 4.7 | 43.0 |
| 5 | 50 | 4.9 | 47.9 |
| 5 | 55 | 5.1 | 53.0 |
| 5 | 60 | 5.4 | 58.3 |
| 5 | 65 | 5.7 | 64.0 |
| 5 | 70 | 6.0 | 70.0 |
| 5 | 75 | 6.4 | 76.3 |
| 5 | 80 | 6.8 | 83.1 |
| 5.5 | 85.5 | 8.2 | 91.3 |
| | Closed Position | | Extended Position |

Figure 5:
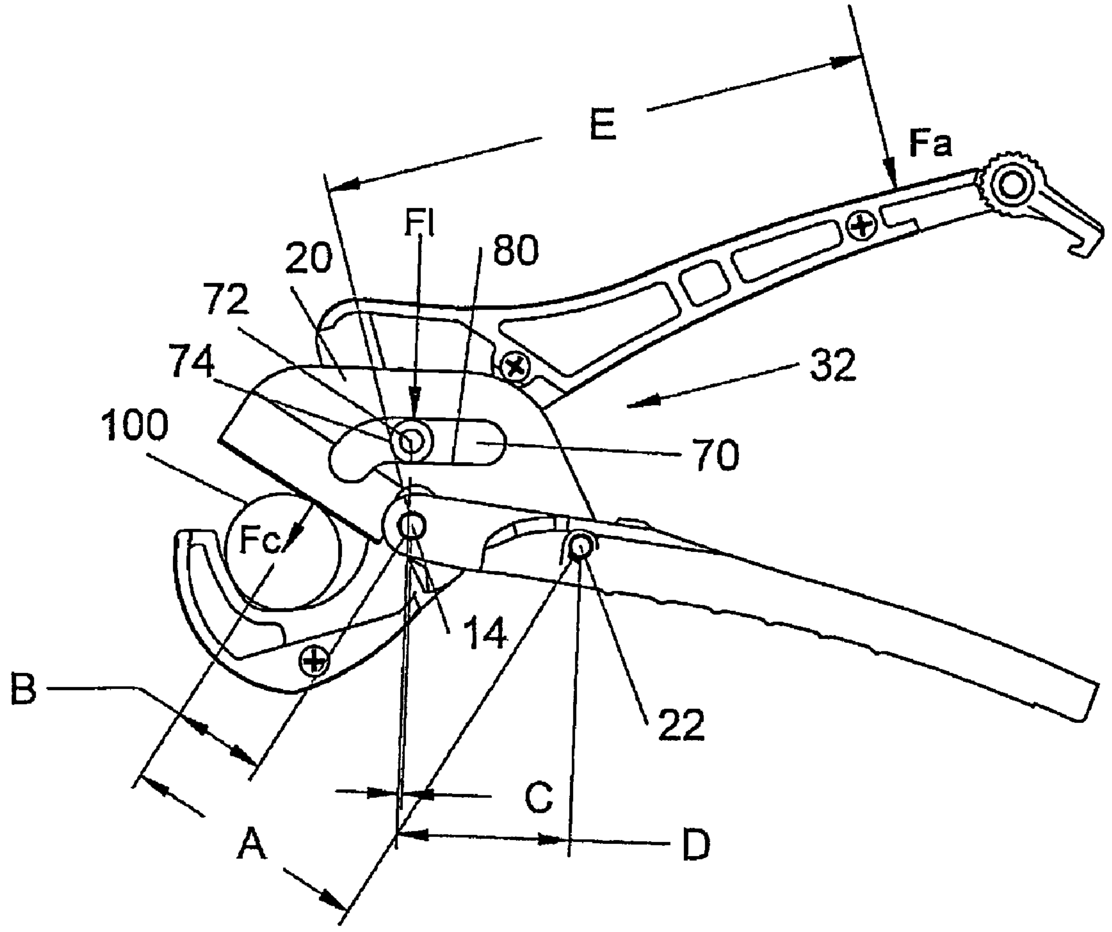
FIG. 5 is a plan view of the subject tool shown in partial cross-section with a free body force diagram overlaid thereon; and, FIG. 6 is a graph showing a mechanical advantage provided by the subject tool over a range of degrees of handle travel.

As noted above, it is to be appreciated that the subject cutter tool provides an optimized mechanical advantage to users of the tool in cutting plastic pipe. More particularly, a mechanical advantage $M_A$ is provided relative to an applied force $F_A$ applied equally and oppositely against the handle portions 28, 48 of the first and second elongate members 12, 16 in turn effecting a compressive force $F_C$ by the cutting edge 62 of the cutter blade 20 on an associated circular workpiece such as a plastic pipe. FIG. 5 shows a free body diagram layered upon a cross-sectional view of the mechanical linkages forming the subject cutter tool 10. As illustrated, an applied force $F_A$ is applied at a distance E from the handle axis 14. With the first elongate member 12 held fixed, the applied force $F_A$ moves the second elongate member 16 from the opened position shown in FIG. 4*a* to a closed position shown in FIG. 4*c* to effect a cutting of the associated circular workpiece 100.

As noted above, pivotal movement of the handle portion 28 of the second elongate member 16 about the handle axis 14 urges the cutter blade 20 forward through the first and second guide portions 32, 66 formed in the first elongate member 12 and in the cutter blade 20, respectively. Also, pivotal movement of the cutter blade is effected during movement of the second elongate member 16. As shown in FIG. 5, the roller 74 carried on the pin. 72 in the first guide portion 32 creates a counteractive loading force $F_L$ against the first side wall 80 of the cam slot 70 in reaction to the cutting force $F_C$ applied to the workpiece 100. As those of ordinary skill in the art would understand, both the loading force $F_L$ as well as the cutting force $F_C$ are generated in directions normal to their respective load surfaces. In the case of the loading force $F_L$, the force is applied against the first side wall 80 in a direction normal to a surface thereof. Similarly, the cutting force $F_C$ is applied to the associated workpiece 100 in a direction normal to a surface thereof.

Figure 6:
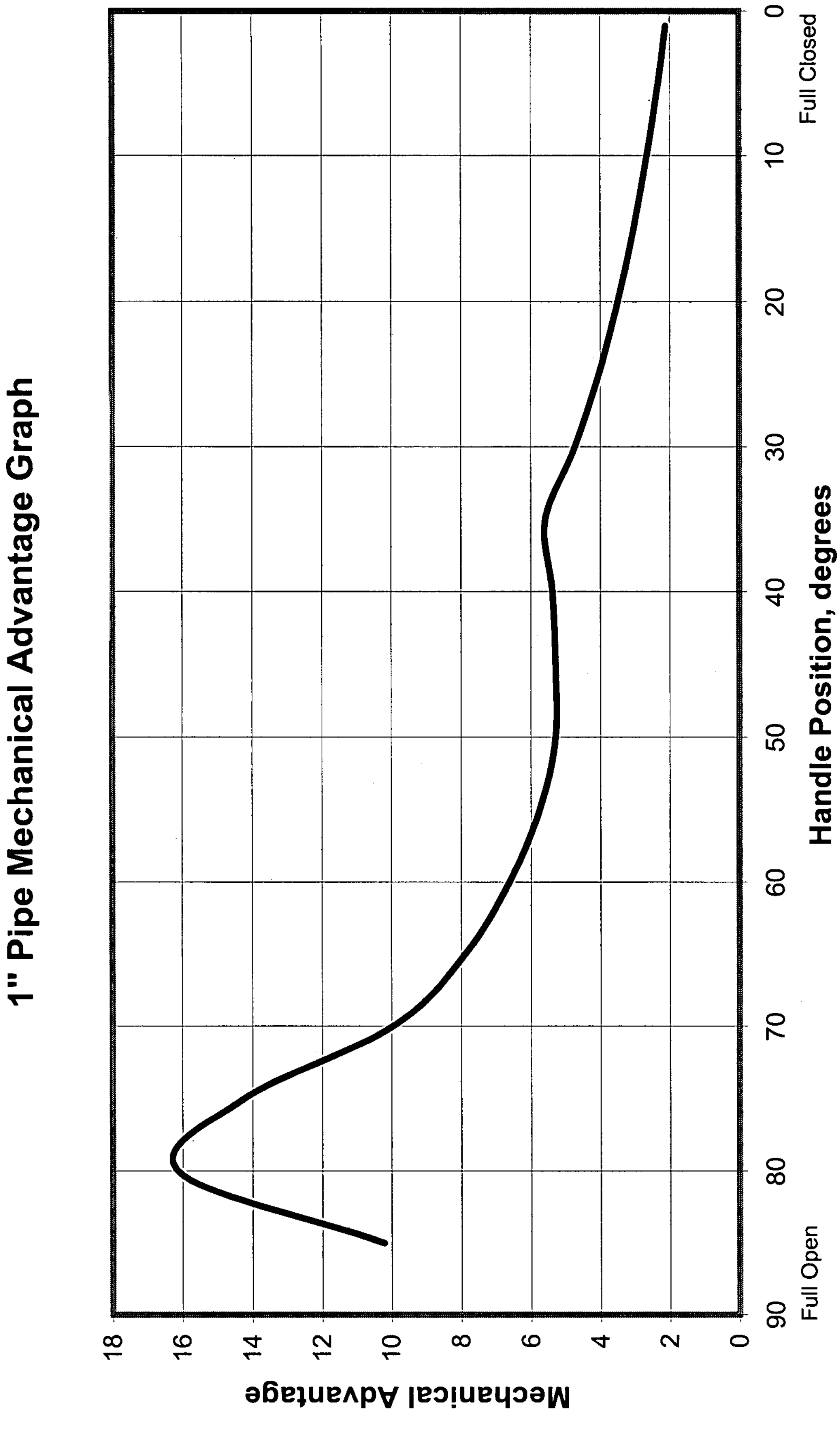

Overall, a mechanical advantage $M_A$ is provided in the subject cutter tool 10 during the initial portions of a cutting stroke through a workpiece illustrated at X in FIG. 4*a*. For purposes of illustrating an advantage of a preferred embodiment of the subject cutter tool, FIG. 6 shows a mechanical advantage graph realized by the subject tool while cutting an associated workpiece in the form of a standard plastic pipe having a one inch (1") nominal outer diameter (actual O.D. is 1.315 inches). As illustrated there, the mechanical advantage is at its greatest when the handles of the cutter tool are in an opened position to enable the user to grip the tool and more easily squeeze and cut the workpiece with an opened hand. This occurs with the handles being operated between about 90° and about 70°. Typically of course, users have more hand strength as the hand is more fully closed rather than in an opened position. The subject tool compensates for the decreased mechanical advantage in the hand in an opened position by providing additional mechanical advantage during that phase of the operation. As the user's hand is closed, however, the mechanical advantage realized in the first portion of tool operation is diminished slightly but is easily overcome by the user's strength. This occurs with the handles being operated about 70° and about 35°.

With reference once again to FIG. 5, the mechanical advantage provided by the tool is based upon dimensions and the geometry of the tool and the shape of the slot 70 formed by the cutter blade 20. In FIG. 5, the blade axis 22 is spaced from the cutting force $F_C$ in a direction perpendicular to the cutting force $F_C$ by a first distance A. Also as shown there, the handle axis 14 is spaced from the cutting force $F_C$ in a direction perpendicular to the cutting force $F_C$ by a second distance B. In addition, the handle axis 14 is spaced from the loading force $F_L$ in a direction perpendicular to the loading force $F_L$ by a third distance C. Also, as noted above, the applied force $F_A$ is applied at a distance E from the handle axis 14. Lastly, the blade axis 22 is spaced from the loading force $F_L$ in a direction perpendicular to the loading force $F_L$ by a fourth distance D to provide a mechanical advantage $M_A$ according to:

$$M_A = \frac{F_C}{F_A} = \frac{(E \cdot D)}{(B \cdot D) + (C \cdot A)}.$$

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A cutter tool comprising:

a first elongate member having a first end defining a cradle portion adapted to receive an associated circular workpiece therein, a second free end opposite the first end and defining a first handle portion for gripping the cutter tool, and a first guide portion located at a position on the first elongate member between said cradle portion and said handle portion;

a second elongate member having a first end pivotally attached with said first elongate member at a handle axis located on said first elongate member between said first guide portion and said cradle portion, and a second free end opposite the first end and defining a second handle portion for gripping the cutter tool;

a cutter blade defining a blade pin opening and having a first end pivotally attached with said second elongate member by the blade pin opening and a blade pivot pin extending therethrough at a blade axis located on said second elongate member between said first end and said second end of said second elongate member, a second end opposite the first end and carrying a cutting edge, and a second guide portion directly coupled with the first guide portion of the first elongate member to control pivotal movement of the cutter blade about said blade axis during relative movement between said first and second elongate members about said handle axis, the second guide portion including an elongate slot defined in the blade, the slot being disposed between the blade pin opening of the cutter blade and the second end of the cutter blade;

a cam follower received in said elongate slot; and, wherein the cutter blade is pivotally movable in a plane extending perpendicular with each of the handle and cutter blade axes.

2. The cutter tool according to claim 1 wherein:

said first and second elongate members are pivotally movable about said handle axis through a first angle $\Phi_1$ between an open position whereat said first and second handle portions are spaced apart, and a closed position whereat the first and second handle portions are in close alignment; and, said cutter blade is pivotally movable about said blade axis through a second angle $\Phi_2$ between a retracted position whereat the cutting edge of the cutter blade is spaced from the cradle portion of the first elongate member, and an extended position whereat the cutting edge is brought through the cradle portion.

3. The cutter tool according to claim 2 wherein said second angle $\Phi_2$ is greater than said first angle $\Phi_1$.

4. The cutter tool according to claim 3 wherein:

said cutter blade is pivotally movable from said retracted position to said extended position through said second angle $\Phi_2$ of about 93.1 degrees to cut said associated workpiece received in said cradle portion in response to pivotal movement of said first and second elongate members from said open position to said closed position through said first angle $\Phi_1$ of about 85.5 degrees.

5. The cutter tool according to claim 4 wherein:

movement of said first and second elongate members through said first angle $\Phi_1$ between said open and closed positions urges said pivotal movement of said cutting blade through said second angle $\Phi_2$ according to a predetermined relationship.

6. The cutter tool according to claim 5 wherein said predetermined relationship between said first angle $\Phi_1$ and said second angle $\Phi_2$ is approximated substantially according to:

$$\Phi_2=(1.02)\Phi_1-0.98.$$

7. The cutter tool according to claim 5 wherein said predetermined relationship includes a relationship wherein said second angle $\Phi_2$ is a non-linear function of said first angle $\Phi_1$.

8. The cutter tool according to claim 7 wherein said second angle $\Phi_2$ is a non-linear function of the first angle $\Phi_1$ substantially according to:

$$\Phi_2=(7.0E-05)\Phi_1^3-(6.04E-03)\Phi_1^2+(1.1)\Phi_1+0.170.$$

9. The cutter tool according to claim 2 wherein:

said first guide portion includes a guide pin extending from said first elongate member along a guide pin axis; and, said elongate slot defined in said cutter blade is adapted to receive said guide pin therein.

10. The cutter tool according to claim 9 wherein each of said handle axis, said blade axis, and said guide pin axis extend in parallel with each other.

11. The cutter tool according to claim 9 wherein:

said elongate slot is defined in said cutter blade between spaced apart elongate first and second opposite side walls extending between spaced apart end walls; and, said guide pin is configured to engage said first and second side walls of said elongate slot to urge relative movement between said cutter blade and said second elongate member as said first and second elongate members are moved between said opened and closed positions.

12. The cutter tool according to claim 9 wherein said elongate slot has a predefined shape.

13. The cutter tool according to claim 9 wherein said elongate slot has a one of a generally L-shape, a straight shape, a crescent shape, an arc shape, an irregular shape, and a shape of a plurality of interconnected arcs.

14. The cutter tool according to claim 2 wherein:

said first and second elongate members are adapted to receive an actuating force $F_A$ applied to said first and second handle portions at an actuating distance E from said handle axes and to move relative to said first and second elongate members from said open position to said closed position in response to said actuating force $F_A$ being applied to said first and second handle portions; and, said cutting blade is pivotally movable from said retracted position to said extended position in response to said movement of said first and second elongate members to engage said circular workpiece with said cutting edge to generate a cutting force $F_C$ against the workpiece in a cutting force direction normal to an outer surface of the associated circular workpiece and extending through a center of the circular workpiece.

15. The cutter tool according to claim 14 wherein:

said first side wall of the elongate slot defined in said cutter blade is configured to transmit a loading force $F_L$ between the actuating force $F_A$ applied to said first and second handle portions and the cutting force $F_C$ applied to said associated circular workpiece, the loading force $F_L$ extending in a direction normal to said first side wall of the elongate slot and directed through said guide pin on said first elongate member.

16. The cutter tool according to claim 15 wherein:

relative sizes of the first and second elongate members and the cutting blade and relative distances between the handle axis, the blade axis, and the guide pin axis are selected to realize a mechanical advantage $M_A$, wherein $M_A=F_C/F_A$ in a range of 2.1-16.1 for an associated circular workpiece having an outer diameter of about 1.315 inches.

17. The cutter tool according to claim 16 wherein:

said blade axis is spaced from said cutting force $F_C$ in a direction perpendicular to said cutting force $F_C$ by a first distance A;

said handle axis is spaced from said cutting force $F_C$ in a direction perpendicular to said cutting force $F_C$ by a second distance B;

said handle axis is spaced from said loading force $F_L$ in a direction perpendicular to said loading force $F_L$ by a third distance C; and, said blade axis is spaced from said loading force $F_L$ in a direction perpendicular to said loading force $F_L$ by a fourth distance D to provide a mechanical advantage $M_A$ in said cutter tool of:

$$M_A = \frac{F_C}{F_A} = \frac{(E \cdot D)}{(B \cdot D) + (C \cdot A)}.$$

* * * * *